March 17, 1964 M. J. COHEN 3,125,092
INFUSION FLASK
Filed June 30, 1961

INVENTOR.
MILTON J. COHEN
BY

United States Patent Office 3,125,092
Patented Mar. 17, 1964

3,125,092
INFUSION FLASK
Milton J. Cohen, Chevy Chase, Md., assignor to Pharmedical, Inc., Chicago, Ill., a corporation of Illinois
Filed June 30, 1961, Ser. No. 121,070
5 Claims. (Cl. 128—272)

This invention relates to the care and administration to the needs of the human body and to devices employed in connection therewith to maintain the body in the best and most healthful physical and mental condition in order to increase and maintain the efficiency of the body and to preserve and lengthen the life span thereof.

The application is a continuation-in-part of my copending application Ser. No. 837,839, filed September 3, 1959, and entitled "Infusion Flask," now abandoned.

The invention relates specifically to supplying the body with medicinal and other substances needed for the welfare thereof and to apparatus or equipment including that employed in intravenous introduction into the blood stream thereof, such as an infusion flask or holder and an additive container for supplying matter to the infusion flask, all of which substances and equipment must be kept sterile.

In the injection of material into the circulatory system of the body, fluids are allowed to flow gravitationally from a container through a tube and through a needle into a vein of the patient and, oftentimes, substances are added to such fluid, all of which introduces complications due to the necessity for supporting the infusion flask and the container for the additive, as well as making the necessary connections, in addition to maintaining the equipment and materials sterile.

It is an object of this invention to provide a relatively simple and inexpensive additive container for the supply of matter to an infusion flask, which additive container is provided with a needle through which the additive material can be introduced into the infusion flask and with pressurizing means for withdrawing the solution from the infusion flask, mixing it with the matter in the additive container, and exerting positive pressure for return of the mixed solution to the infusion flask.

Another object of this invention is to provide an additive container having a transparency to permit observation of the content material and a hollow compressible portion which can be manipulated to produce suction or compression without relative endwise movement between the additive container and the infusion flask which might otherwise result in the inadvertent disengagement therebetween and in which the additive container is provided with a needle which can be inserted through a wall of the infusion flask for establishing direct communication with the interior of the infusion flask without producing a core when the wall is punctured.

A further object of this invention is to provide a relatively simple and inexpensive, disposable, additive container for a substance to be combined with fluid administered by means of an infusion flask and in which the container is formed with integral suction and producing means and with an outlet passage adapted detachably to support a non-coring needle for insertion through the closure of the infusion flask for direct communication with the interior thereof.

These and other objects and advantages of this invention will hereinafter appear and, for purposes of illustration, but not of limitation, embodiments of the invention are shown in the accompanying drawing, in which.

Briefly described, the invention resides in an additive container for the supply of matter to an infusion flask from which a solution is allowed to flow by gravity through a tube and connecting needle into the circulatory system of a patient or recipient, the container having a portion for holding the additive, a non-coring needle for piercing the closure of the infusion flask for the establishment of communication with the interior thereof, and a bulbous portion formed of a flexible material for the generation of pressure or suction responsive to the compression or release respectively of the bulbous portion and in which the additive container is used for the integrating of an additive with the fluid in the infusion flask, the additive being either a liquid or powder, so that, by the direct introduction into the infusion flask or by the exertion of pressure for withdrawal of fluid from the infusion flask, mixing it with the additive and returning the mixture into the infusion flask, the solution may be made ready for administration.

Figure 4:
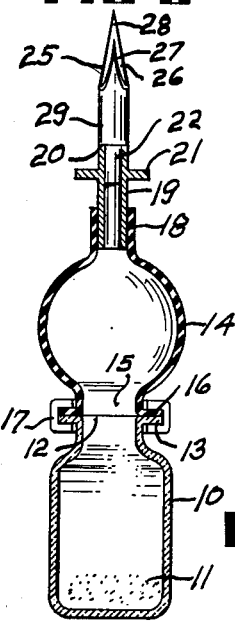
FIG. 4 is a sectional view of a modification in a container embodying the features of this invention.

With reference now to FIG. 4 of the drawing, the additive container is illustrated as a transparent flask or container in the form of a bottle or vial 10 adapted to contain an additive 11 to be administered. The bottle or vial 10 has a reduced neck or mouth portion 12 formed with a flange 13 extending outwardly substantially perpendicularly from the upper edge thereof. In order to discharge matter from the bottle, a bulbous member 14 of resilient material, such as rubber or the like, is provided, having a neck portion 15 dimensioned to correspond with the mouth 12 of the bottle 10 and a flange 16 extending outwardly substantially perpendicularly from the lower edge of the mouth and dimensioned to correspond with the flange 13 for positioning in abutting relationship therewith whereby a clamping ring 17 may be employed to secure the flanged portions in sealing relationship when the bulbous portion is assembled into position of use on the mouth of the container. The bulbous pressure member 14 is provided in opposite relation to its neck 15 with a sleeve section 18, the bore of which is substantially smaller than that of the neck 15 and which is adapted to receive a coupling member 19 having an upper end 20 and an annular collar or flange 21. Within the coupling member 19, there is received the reduced end portion 22 of a needle 23 having a shoulder 24 which abuts the upper end 20 of the coupling 19. The needle is provided at its outer end with angular cuts 25 and 26 at each side to define shorter and longer points 27 and 28, with the portion defining the point 27 being turned toward the longer side having the point 28, the bore 29 of the needle thus being provided with a discharge at each side of the tip 27. In application of the device, the flexible bulbous member 14, when compressed by lateral pressure, produces a pumping action. If it is desired to withdraw liquid from the infusion flask this can be done by compressing the bulbous member 14 before insertion of the needle into the infusion flask so that upon release of the pressurizing member 14, suction will draw fluid into the additive container where it can be agitated by shaking to achieve admixture between the withdrawn fluid and the material in the additive container. Thereafter, the pressurizing member 14 can be compressed forcibly to return the mixture into the infusion flask.

Figure 1:
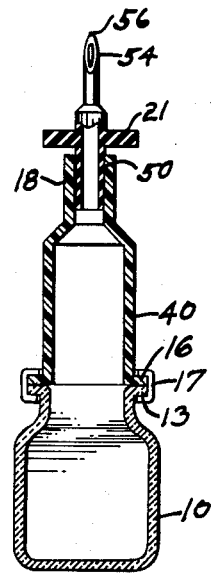
FIG. 1 is a longitudinal sectional view through an additive container embodying the features of this invention.
Figure 2:
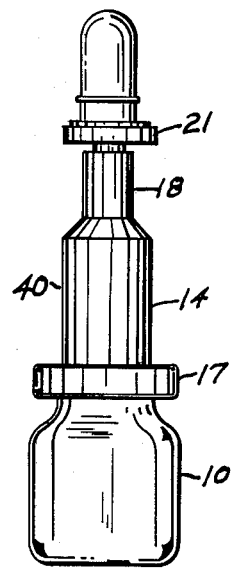
FIG. 2 is an elevational view of the container shown in FIG. 1 with a closure mounted on the end of the needle member.
Figure 3:
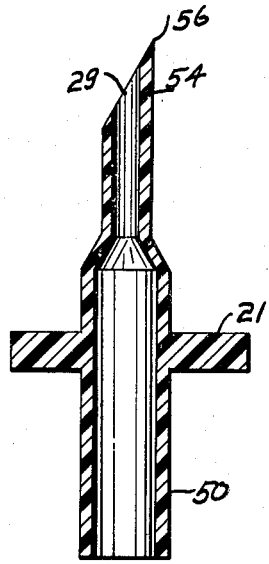
FIG. 3 is a sectional view of the needle shown in FIG. 1.

The container 10 illustrated in the lower portion of each of the FIGS. 1, 2 and 4 is substantially the same. However, in the modification shown in FIGS. 1 and 2, illustration is made of an additive container which is substantially similar to that described with reference to FIG. 4 with the exception that the compressible bulbous member intermediate the flask 10 and the needle 23 comprises an elongate member 40 wherein the bulbous compressible portion is of cylindrical shape but of sufficiently large cross-section to enable deformation in the crosswise or radial direction for the generation of pressure and suction, as the case may be.

In an assembly of the type described, it is desirable to confine the application of force for the generation of suction and pressure by radial deformation of the bulbous portion as distinguished from lengthwise deformation, otherwise forces will be present which might cause endwise relative movement between the additive container and the infusion flask whereby the needle might be inadvertently withdrawn from the infusion flask and thereby render unusable the materials being mixed.

Thus it has been found to be important to construct the additive container with a stop in the form of the collar 21 beyond the bulbous portion to define the amount that the needle might be inserted through the cover of the infusion flask so that the bulbous compressible portion might be located immediately beyond the cover where it is readily accessible for deformation by the application of force from a crosswise direction so that there will be no danger of endwise relative movements between the inserted needle of the additive container and the infusion flask, while in position of use.

In FIG. 4 there is shown a unitary needle which may be used in the practice of this invention having a base portion 50 dimensioned to be received in fitting relationship within the sleeve section 18 at the upper end of the bulbous member 14. The annular collar or stop 21 is positioned intermediate the ends of the needle to seat on the outer face of the closure of the infusion flask when the needle is properly inserted into position of use. The point 54 of the needle is formed by an angular cut to define a piercing point 56 at one edge for ready insertion through a puncturable portion in the closure of the infusion flask.

It will be apparent from the foregoing that the present invention comprises a container, a compressible pressurizing member and a non-coring needle, the pressurizable member being adapted to be presented by deformation in response to lateral force to expel air and to draw material into the container upon release, to mix the withdrawn material with the contents of the container, and thereafter again squeezed by the application of lateral force to eject the mixture from the container for return to the infusion flask. Though it is preferred to construct the container 10 of a transparent material for observation of the materials in the interior thereof, the container 10 might equally be formed of other translucent or non-transparent materials.

It will be further understood that various changes may be made in the details of construction, arrangement and operation without departing from the spirit of the invention, especially as defined in the following claims.

I claim:

1. An additive container for matter to be administered by means of an infusion flask, said container comprising a portion for holding additive material and having an open end, a flange extending outwardly substantially perpendicularly continuously from the open end of the container, a compression member formed of flexible material consisting of a central bulbous member of substantially elongate, cylindrical shape for transverse compression to create a pumping action, said compression member having a flange extending outwardly substantially perpendicularly from one end and adapted to be received in abutting end to end, parallel relationship with the flange on the container, and a sleeve section of smaller dimension than the compression member at the other end with a continuous passage therethrough to the bulbous portion and from the bulbous portion through the flange section without any obstructions in between, a clamping ring interconnecting the abutting flanges of the compression member and the container in sealing relationship with the bulbous member disposed substantially entirely beyond the open end of the container for full access thereto for engagement between fingers, and an elongate stiff penetrating tube having a tubular inner end portion received in fitting relationship in said sleeve section and having a pointed outer end portion for piercing the infusion flask for establishing a connection between the container and the flask whereby fluid may be withdrawn from the flask into the container, mixed with the material in the container and re-injected into the flask.

2. An additive container as claimed in claim 1 which includes a cap received in fitting relationship on the outer end of the penetrating tube for closure thereof.

3. An additive container as claimed in claim 1 in which the container is formed of a transparent material for visual inspection of the contents thereof.

4. An additive container as claimed in claim 1 in which the stiff penetrating tube includes means intermediate its ends for functioning as a stop when the needle end portion of the penetrating tube has been inserted the desired distance into the infusion flask.

5. An additive container as claimed in claim 4 in which the stop means comprises an annular collar extending outwardly substantially perpendicularly from an intermediate portion of the penetrating tube.

References Cited in the file of this patent

UNITED STATES PATENTS

| 2,431,192 | Munson | Nov. 18, 1947 |
| 2,434,875 | Turnbull | Jan. 20, 1948 |
| 2,953,132 | Richter | Sept. 20, 1960 |
| 2,954,769 | Callahan | Oct. 4, 1960 |
| 3,033,203 | Barton | May 8, 1962 |